United States Patent [19]

Wiklund

[11] 4,443,417
[45] Apr. 17, 1984

[54] METHOD FOR SEPARATING GASEOUS, ELEMENTARY MERCURY FROM A GAS

[75] Inventor: Johan E. Wiklund, Helsingborg, Sweden

[73] Assignee: Boliden Aktiebolag, Stockholm, Sweden

[21] Appl. No.: 368,210

[22] Filed: Apr. 14, 1982

[30] Foreign Application Priority Data

May 8, 1981 [SE] Sweden ................................ 8102898

[51] Int. Cl.$^3$ ............................................ B01D 53/34
[52] U.S. Cl. ........................................ 423/210; 55/72
[58] Field of Search ............................ 423/210; 55/72

[56] References Cited

U.S. PATENT DOCUMENTS

| | | | |
|---|---|---|---|
| 3,677,696 | 7/1972 | Bryk et al. | 423/210 |
| 3,838,190 | 9/1974 | Birke et al. | 423/210 |
| 3,849,537 | 11/1974 | Allgulin | 423/210 |
| 4,009,241 | 2/1977 | Kawase et al. | 423/210 |
| 4,138,231 | 2/1979 | Hedenas et al. | 55/72 X |
| 4,233,274 | 11/1980 | Allgulin | 423/210 |

Primary Examiner—Earl C. Thomas
Attorney, Agent, or Firm—Stevens, Davis, Miller & Mosher

[57] ABSTRACT

The invention relates to a method for separating gaseous elementary mercury from a gas in conjunction with a wet-gas cleaning process comprising a plurality of washing stages. The mercury-containing gas is treated with an aqueous washing liquid conducted in a closed circuit, the liquid containing 0.1–300 mmol/l mercury (II) ions and at least twice this amount of ions having the ability of forming complexes with mercury (II) ions, the mercury in the gas being oxidized and absorbed in the washing liquid. The invention is characterized in that the treatment process is carried out in conjunction with a gas-cooling process effected after the last washing stage of the wet-gas cleaning process, to form a condensate for absorbing the halogens contained in the gas. The resultant condensate is transferred to the washing liquid and the mercury (II) content of the washing liquid is maintained by contacting the washing liquid with an oxidizing agent for mercury (I) ions. The agent used to oxidize mercury (I) ions is preferably chlorine gas.

8 Claims, 1 Drawing Figure

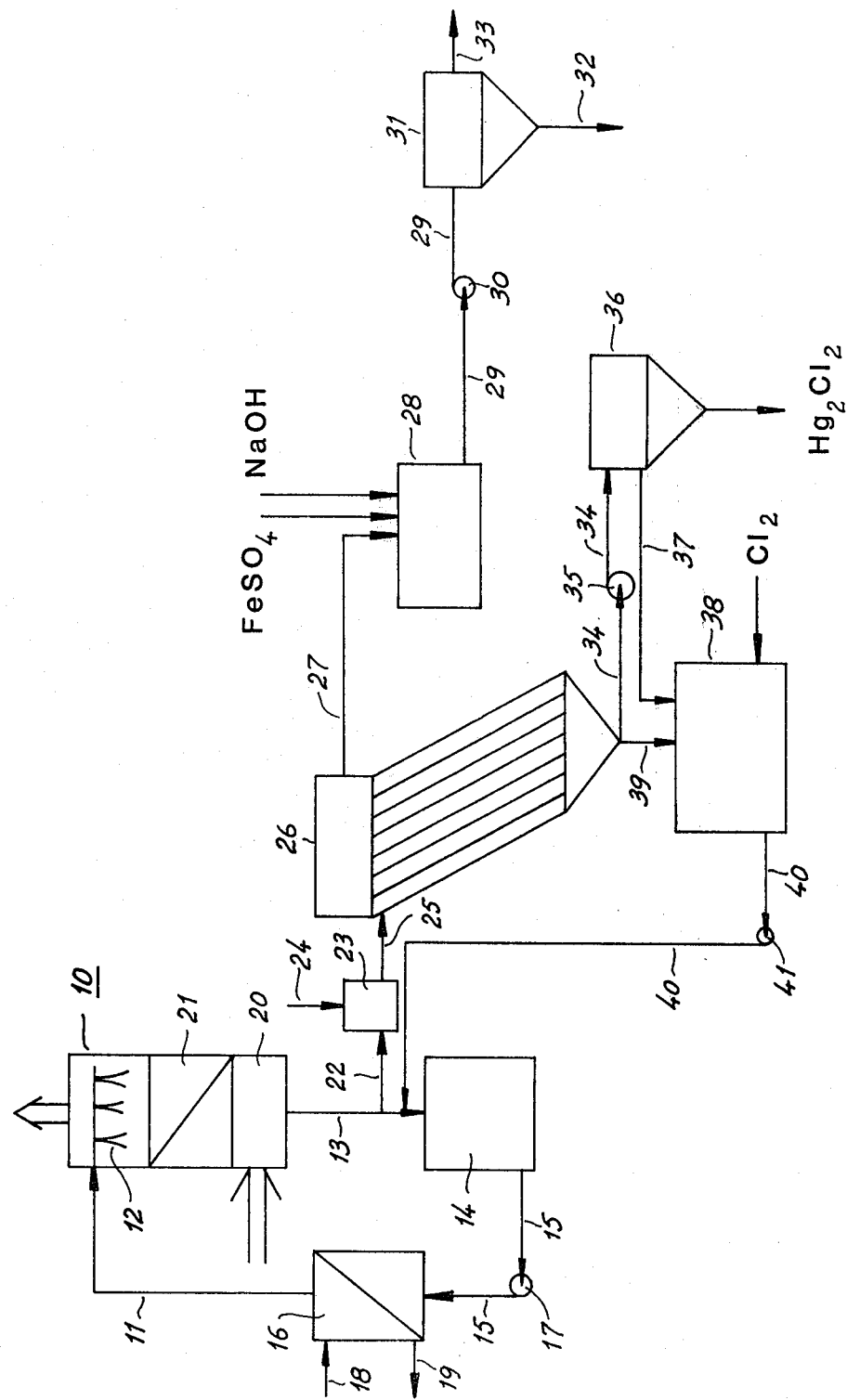

METHOD FOR SEPARATING GASEOUS, ELEMENTARY MERCURY FROM A GAS

The present invention relates to a method for separating gaseous, elementary mercury from a gas in conjunction with a wet-gas purifying process, in which the gas containing the mercury is treated with an aqueous washing liquid conveyed in a closed circuit and containing 0.1–300 mmole/liter mercury (II) ions and at least twice that amount of ions which have the ability to form complexes with mercury (II) ions, and in which mercury present in the gas is oxidized and absorbed in the washing liquid. The method is particularly suited for the recovery of mercury from gases obtained when roasting sulphide ores containing mercury. The method, however, can also be applied to advantage for eliminating mercury from other gases, in conjunction with the wet-gas cleaning of said gases, for example of combustion.

The number of countries today in which strict regulations must be observed with respect to the emission of mercury from industrial processes is steadily increasing. Many new gas-purification processes for the elimination of elementary mercury have been proposed during the last ten years, such mercury being one of the major sources of industrial mercury emission. The majority of these purification methods, and particularly those exhibiting the highest efficiencies, are much too complicated technically, however, and require the provision of expensive specially designed apparatus if a satisfactory result is to be achieved. One of the most significant and effective methods in this respect is the so-called 'Boliden Norzink Process", also known as the "chloride process". The process is more closely described in U.S. Pat. No. 3,849,537 and U.S. Pat. No. 4,233,274, and is carried out in a washing plant having a separate absorption tower, in which a washing solution is sprayed over packing bodies through nozzles, the solution being collected at the bottom of the tower. The washing plant also incorporates separators, regenerating means, pumps and conduit systems for returning washing liquid to the system and for dumping said washing liquid.

Even though the investment or operational costs of such a washing plant are not unreasonable compared with those washing plants employed in the majority of other gas-purifying methods for the removal of gaseous elementary mercury, the costs can still be considered high, and consequently prohibitive to many presumptive users, the activities of which are unable to stand additional high costs in protecting the environment. In such cases the alternative is to continue to discharge mercury to the environment to the extent permitted by the authorities and the laws of the country in question, or to select a purifying method which provides a given purifying effect at comparatively small cost. Thus, the lack of an attractive and satisfactorily efficient alternative must be paid for by the continued destruction of the environment. Neither is the problem relating to the costs involved for separate mercury-absorption plants reduced by the ever increasing requirements placed on the purification of gases, both with respect to dust and—in addition to mercury—to many other gaseous contaminants, such as sulphur dioxide, nitrogen oxides, arsenic compounds and heavy metal compounds.

A method for effectively purifying roaster gases containing, inter alia, arsenic and halogens, is described in U.S. Pat. No. 4,138,231. In this method, the roaster gases are washed with a sulphuric acid solution in at least two stages, whereat the last washing stage is carried out with sulphuric acid at elevated temperatures, such that the gases are given a water content which results in considerable water condensate in a subsequent cooling stage, gaseous halogen compounds, for example heavy-metal halogenides, being absorbed in the condensate, from which the heavy metal ions are precipitated with suitable precipitating reagents, thereby to enable a cleansed condensate contaminated with substantially solely halogens to be carried away. In spite of this, the major part of any elementary mercury present will pass through the wet-gas cleaning system, even though, according to the description, a certain degree of purification can be obtained in the other washing stage, provided that mercury (II) ions are present in the washing liquid. The elevated temperature in said washing stage and the presence of sulphur dioxide in the gas, however, counteract the possibility of maintaining the desired mercury (II) content of the washing liquid and of attaining a sufficiently effective absorption of mercury in the washing liquid, since the vapour pressure for the mercury compounds formed and present in the washing liquid is relatively high at the temperature in question, and also because the sulphur dioxide greatly reduces the mercury (II) ions. Consequently, in order to obtain acceptable elimination of the mercury, it is necessary, in many instances, to apply separate, additional purification methods, either for purifying the gas or the sulphuric acid produced by said gas, which may, of course, be prohibitive and thus result totally in a lower degree of mercury elimination than would otherwise be technically possible.

In accordance with the present invention it has now surprisingly been found possible to effectively cleanse gas with respect to gaseous elementary mercury in combination with a wet-gas cleaning process, for example, of the kind described in the introduction, without needing to install any separate apparatus for absorbing the mercury. The method can also be carried out in combination with other wet-gas cleaning processes, and also with gases other than roaster gases, provided that the gas is cooled in one stage of the method to form a condensate for the elimination of environmentally harmful halogen compounds.

Thus, the purpose of the method according to the invention is to provide an integrated gas-purifying process at plant and operational costs which are considerably lower than has hitherto been possible to achieve when purifying the gas to the same extent, the method being characterized by the features set forth in the accompanying claims.

Other details and features of the invention will stand out from the description given below by way of non-limitative example and with reference to the accompanying drawing, in which:

Roaster gas obtained from a sulphide-ore roasting process is first subjected to a dry-gas cleaning process, to remove coarse dust-like impurities, such as solid mercury compounds, and a multistage-washing process in a sulphuric acid solution, to remove finer dust particles and condensible compounds, whereafter gas is introduced to the lower part of a gas-washing apparatus or scrubber 10, as indicated by the arrow. The gas, which has a temperature of 60°–70° C. and is saturated with moisture at this temperature, is washed and cooled simultaneously with a washing solution which is introduced to the gas-washing apparatus 10 through a line 11 connected to the upper part of said apparatus. The washing liquid is atomised in the gas-washing apparatus, by spraying said liquid through nozzles 12. The washing liquid comprises mainly water, with only minor quantities of acids therein, for example 0.5% $H_2SO_4$, together with HCl and HF making a total of about 10 g/l, and also contains mercury (II) ions in a given quantity, together with halogen ions as complex former. The washing liquid is caused to circulate in a circuit comprising a line 13 extending from the lower part of the apparatus 10, a circulation vessel 14, a line 15 and a liquid cooler 16, for example a plate heat exchanger. The washing liquid is circulated in said circuit by means of a circulation pump 17, back to the gas-washing apparatus 10 through the line 11 and nozzles 12. The washing liquid is cooled directly in the liquid cooler 16 to the extent desired, preferably to a temperature below 40° C., using cold water introduced to the cooler 16 at 18 and removed therefrom at 19. When cooling the condensate formed by the gas, said condensate comprising among other things water, arsenic ions and heavy metal ions, together with halogenide ions and washing liquid, can be collected in the form of a liquid bath 20 in the lower part of the washing apparatus 10, or may also be caused to circulate further in the circulation circuit without forming a liquid bath. During its passage through the gas-washing apparatus 10, the moist gas must first pass through the liquid bath 20, when such a bath is formed, and during its continued passage up through the apparatus 10 will be cooled progressively in the reaction zone 20, filled with packing bodies for example, and leave the apparatus 10 at the top thereof, as indicated by the arrow. The temperature of the gas leaving the apparatus 10 is normally below 40° C.

The washing liquid is charged to the apparatus 10 in such an amount relative to the amount of gas entering said apparatus that the temperature of the liquid is raised at most by about 20° C., preferably only by about 10° C., during its passage through the gas-washing apparatus. Thus, in order to achieve satisfactory elimination of mercury, the temperature of the liquid leaving the apparatus 10 should not be greater than 60° C. In this way, the washing liquid sprayed through the nozzles 12 will function as a gas-cooling medium and as a means for capturing condensate droplets formed as a result of said cooling process, so that both washing liquid and condensate from the gas will pass down through the zone 21, towards the bottom of the washing apparatus, either to be collected in the form of said liquid bath 20, or to be further advanced in the circulation circuit through the line 13. The requisite, predetermined quantities of mercury (II) ions and halogenide ions, preferably chloride ions, for forming mercury (I) halogenides and for the complex binding of the mercury (II) ions are maintained in the washing liquid by taking a part flow of the liquid and carrying said part flow through a line 22 to a reaction vessel 23, in which the liquid is subjected to a reduction process.

As indicated by the arrow 24, reduction of the partflow liquid in the vessel 23 can be carried out by introducing into said vessel a reductant, or some other reagent which will form a reductant in said vessel, and contacting said reductant with the washing liquid. Alternatively, said reduction can be carried out by heating the liquid in said vessel, in which case the vessel may have the form of a heat exchanger, or by a combination of heating said liquid and contacting the same with a reduction agent. Suitable reductants are zinc, aluminium, iron, silicon or hydrogen gas in status nascendi. When heating the liquid to effect said reduction, the reductant used is the sulphur dioxide dissolved in the washing liquid. As discussed at great length in the prior publication U.S. Pat. No. 3,849,537, sulphur dioxide reduces mercury (II) ions, provided that they are not complex bound. Heating causes any complexes present to be split-off, and the sulphur dioxide will thus reduce a major part of the mercury (II) content to mercury (I) ions. In order to precipitate mercury to the fullest extent possible, the aforementioned heating process is preferably combined with a reductant addition from external sources.

Consequently, when treating the liquid in the reaction vessel 23, mercury (II) ions dissolved in said liquid will be reduced quantitatively to a monovalent state and will then precipitate in the form of not-readily dissolved mercury (I) chloride, due to the presence of chloride ions are present in the liquid. The chloride precipitate formed and the precipitate formed during the washing process in the scrubber 10 as a result of the reaction $Hg^O + Hg^{2+} + 2Cl^- \rightarrow Hg_2Cl_2(s)$ are then separated from the liquid by introducing said liquid through a line 25 into a separator 26, in the form of a lamella separator, from the upper part of which a clear solution is drawn off through a line 27 and passed to a reaction tank 28. The clear solution contains only about 1% of the arsenic, mercury and other heavy metal compounds introduced into the separator 26. Thus, a typical mercury content is about 20 mg/l, while the arsenic content lies at about 50 mg/l. Alkali, for example sodium hydroxide, and precipitating agents, for example ion (II) sulphate, are introduced into the tank 28, as indicated by the arrows designated $FeSO_4$ and $NaOH$, respectively, said tank 28 being provided with agitating means, not shown. The resultant reaction mixture is transferred by means of a pump 30 to a filter 31, through a line 29, said filter preferably having the form of a filter press from which solid reaction products formed in the tank 28 are removed, as indicated by the arrow 32, for dumping or for returning said product to the roaster furnace in order to work-up said products. The precipitate separated in the filter 31 mainly comprises iron arsenates, but also contain those minor quantities of mercury which remain dissolved in the washing liquid after said reduction process and said treatment in the lamella separator 26.

The mercury is predominantly present in the precipitate as sulphide and/or arsenates. The filtrate obtained from the filter 31 and freed from mercury, arsenic and other heavy metals and containing substantially only impurities containing halogen ions and sodium ions, can be discharged to a recipient without harm to the environment, as indicated by the arrow 33.

The sludge containing mercury (I) chloride separated in the separator 26 is taken out at the lower part of the separator and a part of said sludge is passed to a filter-press 36 by means of a pump 35 and a line 34, from which filter solid mercury (I) chloride is removed, as indicated by the arrow designated $Hg_2Cl_2$, while the liquid containing dissolved mercury (II) ions are transferred through a line 37 to a reaction tank 38, together with the remainder of the sludge separated in the separator 26. Mercury (I) ions present in the sludge are oxidized to mercury (II) ions in the reaction tank 38, which is provided with agitating means not shown, by contacting the slag with a suitable oxidizing agent. The oxidizing agent particularly preferred in this connection is chlorine gas, which is introduced into the tank 38, as indicated by the arrow designated Cl₂. The resultant mercury (II) chloride solution is pumped through a line 40, by means of a pump 41, back to the circuit in which the washing liquid is circulated, through the line 13 to the circulation vessel 14, thereby enabling the supply if mercury (II) ions and complex builders for mercury (II) ions to the gas-washing apparatus 10 for purifying said gas to be satisfactorily supported. The desired surplus of complex-forming ions, i.e. in this case chloride ions, is maintained by establishing a suitable balance between the mercury and chlorides removed from the process and with respect to the amount of chlorine and mercury contained by the gas. When the amount of Hg(II) in the washing liquid lies between 0.02 and 20 g/l, the total amount of Cl shall lie between 0.007 and 350 g/l. In this respect, the chlorine content is selected with regard to the composition of the gas to be cleansed. If the gas contains only minor quantities of components which reduce Hg(II), a lower chlorine content can be selected, while higher contents must be selected, for example, when cleansing gases of the roaster-gas type rich in sulphur dioxide. Thus, the presence of halogen ions completely or partially prevents any reduction of Hg(II) with reducing gas components, because Hg(II) forms with halogens complexes of the type $HgX_n^{2-n}$, where X is halogen and n is an integer between 1 and 4, and because the halogenide ions precipitate mercury (I) halogenides in a readily recoverable form, whereby the mercury (I) ion activity is also low.

The plant of the illustrated embodiment, used to carry out the invention, comprises in principle similar apparatus to that which can be used for wet-gas cleaning purposes in accordance with our previous method described in U.S. Pat. No. 4,138,231. The only modification required for application in accordance with the invention is that the washing liquid is oxidized, either by taking out a part flow for oxidation, as described above, or by introducing an oxidizing agent into the washing liquid in conjunction with the condensation process, and that means are provided which enable the liquid in the reduction stage 23 to be heated, in order to effectively separate mercury from the washing liquid in the form of mercury (I) chloride.

It is true that the cooling and condensation stages are described in U.S. Pat. No. 4,138,231 as stages separate from the washing stage, but notwithstanding this it will readily be understood that the method can also be carried out advantageously with an integrated final-washing and cooling stage of the type described here. Conversely, it will be apparent that the method of the present invention can be carried out in a wet-gas cleaning plant in which the final washing and cooling processes are carried out in two separate stages, the condensate being oxidized in the fashion described here with respect to the washing liquid.

I claim:

1. In a method for separating gaseous elementary mercury and gaseous halogenides of mercury and for other heavy metals from a gas in which the mercury-containing gas is treated with an aqueous washing solution circulating in a closed circuit and containing 0.1–300 mmol/l mercury (II) ions and at least twice that amount of ions capable of forming complexes with mercury (II) ions, and in which elementary mercury present in the gas is oxidized and absorbed in the washing liquid, wherein the improvement comprises saturating the gas having a temperature of 60°–70° C. with moisture, cooling the moisture saturated gas to form a condensate for absorbing gaseous halogenides from the gas, using the washing solution as gas-cooling medium and as a means for capturing condensate droplets formed as a result of said cooling, supplying the solution to the cooling stage in such an amount relative to the amount of gas entering said stage that the temperature of the solution is raised at most by about 20° C., controlling the temperature of the solution leaving said cooling stage to be below 60° C. and maintaining the mercury (II) content of the washing solution by bringing said solution into contact with an oxidizing agent for mercury (I) ions.

2. A method according to claim 1, characterized in that the oxidizing agent for mercury (I) ions is chlorine gas.

3. A method according to claim 1 or claim 2, characterized by removing the washing liquid circulated in said closed circuit from said washing stage; oxidizing said removed washing liquid; and returning said oxidized washing liquid to said washing stage.

4. A method according to claim 1 or claim 2, characterized by oxidizing mercury (I) ions in conjunction with the treatment of said gas.

5. A method according to claim 1 or claim 2, characterized by introducing chlorine gas to said washing liquid as an oxidizing agent; and by utilizing the reaction products mercury (II) ions and chloride ions both as an oxidizing reagent and as a means for absorbing elementary mercury from the gas.

6. A method according to claim 1 or claim 2, characterized by removing a part flow of washing liquid from said closed circuit and treating said part flow with a reductant for precipitating heavy metals dissolved in said liquid; separating the precipitate from the liquid; and dumping said precipitate.

7. A method according to claim 1 or claim 2, characterized by removing a part flow of washing liquid from said closed circuit, and heating said part flow for separating the heavy metal content thereof.

8. A method according to claim 1 or claim 2, in which cooling of the gas is effected simultaneously with the last washing stage, characterized by cooling the washing liquid circulated in said closed circuit indirectly in a separate stage in said circuit before said liquid is returned to the washing stage.

* * * * *